No. 765,523. PATENTED JULY 19, 1904.
M. TURNBULL.
WIRE STRETCHER.
APPLICATION FILED MAY 7, 1904.
NO MODEL.

Witnesses
N. C. Healy

Inventor
Mark Turnbull.
By James J Sheehy
Attorney

No. 765,523. Patented July 19, 1904.

UNITED STATES PATENT OFFICE.

MARK TURNBULL, OF GODERICH, CANADA.

WIRE-STRETCHER.

SPECIFICATION forming part of Letters Patent No. 765,523, dated July 19, 1904.

Application filed May 7, 1904. Serial No. 206,899. (No model.)

*To all whom it may concern:*

Be it known that I, MARK TURNBULL, a citizen of the Dominion of Canada, residing at Goderich, in the Province of Ontario, Dominion of Canada, have invented new and useful Improvements in Wire-Stretchers, of which the following is a specification.

My invention pertains to devices for stretching fence and other wires; and it consists in the peculiar and advantageous wire-stretcher hereinafter described, and particularly pointed out in the claim appended.

Figure 1:
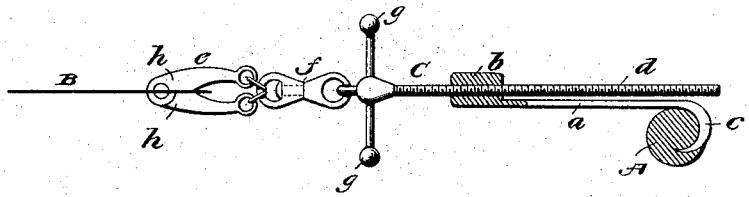
Figure 2:
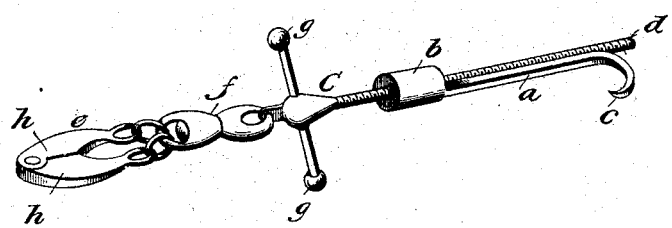
Figure 3:
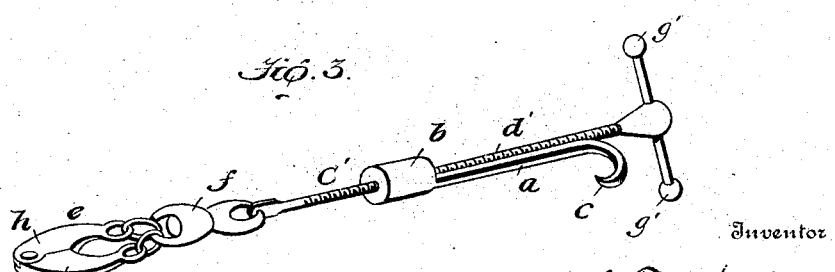

In the accompanying drawings, forming part of this specification, Figure 1 is a plan view of my novel wire-stretcher as the same appears when in use. Fig. 2 is a perspective view of the stretcher removed, and Fig. 3 is a perspective view of a modified form of stretcher.

Referring by letter to the drawings, and more particularly to Figs. 1 and 2 thereof, A is a straining-post, B is a wire to be stretched, and C is my novel stretcher as a whole. In one embodiment of my invention, Figs. 1 and 2, the said stretcher comprises the following instrumentalities—viz., a bar $a$, having an interiorly-threaded lug or nut $b$ at one of its sides, and preferably at or adjacent to one of its ends, and also having a hook $c$ at its opposite side with reference to the lug or nut, which hook is preferably pointed to enable it to take secure hold of the straining-post, as shown in Fig. 1; a screw or threaded rod $d$, extending through and engaging the nut $b$ and resting at the opposite side of the bar $a$ with reference to the hook $c$, for a purpose presently described; a wire-holder $e$, and a swivel connection $f$ between the screw or threaded rod $d$ and the wire-holder $e$. The screw or threaded rod $d$ is preferably provided with handles $g$, which extend in opposite directions from its rear portion, while the wire-holder is preferably of the construction shown—i. e., made up of clamping-jaws $h$, pivotally connected together and connected, through the medium of links $i$, to the rear member of the swivel connection $f$. This construction of wire-holder is advantageous, since when a wire to be stretched is placed between the jaws $h$ and the screw or threaded rod $d$ is turned in the proper direction the same force that stretches the wire operates to hold the wire between the clamping-jaws $h$.

In the practical use of my novel stretcher the hook $c$ is placed in engagement with the post A, and the wire B is placed between jaws $h$ of the wire-holder, after which the screw or threaded rod is turned in the direction to move it forwardly through the lug or nut $b$. When this is done, it will be observed that the wire will be quickly stretched, and this with the expenditure of but a minimum amount of effort on the part of the operator. In placing the wire between the jaws $h$ of the wire-holder the wire is arranged at the side of the holder, and its end portion is carried laterally between the said jaws $h$, as shown in Fig. 1.

In virtue of the screw $d$ of my improved wire-stretcher being disposed at the opposite side of the bar $a$ with reference to the hook $c$ it will be observed that the screw is not checked in its course by the hook, and hence the bar $a$ may be made very short. This latter is materially advantageous, since it contributes to the lightness of the stretcher and the facility with which the same may be handled without detracting in any measure from the efficiency of the stretcher.

It will be appreciated from the foregoing that my novel wire-stretcher is simple and compact in construction and embodies no delicate parts such as are likely to get out of order after a short period of use.

The modified stretcher C' shown in Fig. 3 differs from the stretcher shown in Figs. 1 and 2 in that its handles $g'$ are arranged at the end of the screw $d'$ remote from the swivel connection $f$, the said handles being preferably formed by a rod which extends loosely through a diametrical aperture in an enlargement on the screw and is provided at its ends with knobs, as shown. The arrangement of the handles $g'$ at the opposite end of the screw $d'$ with reference to the swivel connection $f$ is advantageous, since the wire being stretched offers no obstruction to the party manipulating the handles and turning the screw through the medium of the same.

I have entered into a detailed description of the present and preferred embodiments of my invention in order to impart a definite understanding of said embodiments. I do not desire, however, to be understood as confining myself to the specific construction and relative arrangement of parts shown and described, as such changes or modifications may be made in practice as fairly fall within the scope of my invention as claimed.

Having described my invention, what I claim, and desire to secure by Letters Patent, is—

The herein-described wire-stretcher, comprising the bar *a* having an integral hook *c* at one end and an integral lug *b* at its opposite end and on its opposite side, with reference to the hook *c;* the said lug *b* having a threaded bore disposed parallel to the bar *a*, a screw or threaded rod extending through the threaded bore of the lug, a wire-holder, and a swivel connection between the screw or threaded rod and the wire-holder.

In testimony whereof I have hereunto set my hand in presence of two subscribing witnesses.

MARK TURNBULL.

Witnesses:
CHAS. VARCOE,
E. L. DICKINSON.